United States Patent [19]

DiNicola et al.

[11] Patent Number: 4,951,229

[45] Date of Patent: Aug. 21, 1990

[54] APPARATUS AND METHOD FOR MANAGING MULTIPLE IMAGES IN A GRAPHIC DISPLAY SYSTEM

[75] Inventors: Paul D. DiNicola, Kingston, N.Y.; Francois N. Dumas, Cary, N.C.; John J. Lawless, Red Hook, N.Y.

[73] Assignee: International Business Machines Corporation, Armonk, N.Y.

[21] Appl. No.: 223,138

[22] Filed: Jul. 22, 1988

[51] Int. Cl.[5] .............................................. G06F 15/72

[52] U.S. Cl. ...................................... 364/521; 340/725

[58] Field of Search ........ 364/518, 521, 200 MS File, 364/900 MS File; 340/725, 734, 799

[56] References Cited

U.S. PATENT DOCUMENTS

| | | | |
|---|---|---|---|
| 4,197,590 | 4/1980 | Sukonick et al. | 364/900 |
| 4,317,114 | 2/1982 | Walker | 340/721 |
| 4,398,189 | 8/1983 | Pasierb, Jr. et al. | 340/725 X |
| 4,484,187 | 11/1984 | Brown et al. | 340/725 X |
| 4,498,079 | 2/1985 | Ghosh et al. | 340/725 |
| 4,554,538 | 11/1985 | Bieneman | 340/799 |
| 4,567,515 | 1/1986 | Schumacher | 358/107 |
| 4,574,277 | 3/1986 | Krause et al. | 340/703 |
| 4,634,970 | 1/1987 | Payne et al. | 324/121 |
| 4,653,020 | 3/1987 | Cheselka et al. | 364/900 |
| 4,682,297 | 7/1987 | Iwami | 364/521 |
| 4,691,295 | 9/1987 | Erwin et al. | 364/900 |
| 4,757,309 | 7/1988 | Bowater et al. | 340/734 X |

OTHER PUBLICATIONS

IBM Technical Disclosure Bulletin, vol. 28, No. 12, May 1986, pp. 5209–5210, "Hardware Display Windowing System", R. J. Lisle.

IBM Technical Disclosure Bulletin, vol. 29, No. 6, Nov. 1986, pp. 2526–2527, "Color Display Window Control", P. A. Beaven.

*Primary Examiner*—Gary V. Harkcom
*Assistant Examiner*—Mark K. Zimmerman
*Attorney, Agent, or Firm*—Mark S. Walker

[57] ABSTRACT

A graphic display system with the ability to use mulitiple memory buffers to produce images with a wide range of colors through bit plane encoding or to present independent application displays or to combine display images through the use of lateral bit encoding. When operated in the lateral bit encoded state, application programs can be associated with independent memory buffers or an application can use the separate buffers to create a display with animation or apparent movement. Each memory buffer can be independently associated with the display device or the images contained in the memory buffers can be mixed through the use of hardware or software image mixing to create a composite display. The combined image is use to directly control the display device and does not require the creation of an intermediate frame buffer image. This display system provides the capability for animation or image movement through the designation of one or more planes to contain the objects and the designation of display priority among the memory buffers. The image mixer combines the images according to an established display priority so that portions of the highest priority image are always displayed. The images in the memory buffers may, alternatively, be linked to create a single large image which can be scrolled across the display monitor. A method for image mixing and for displaying objects with apparent motion is provided through the use of the multiple memory buffers and display priority assignment.

6 Claims, 3 Drawing Sheets

FIG.2
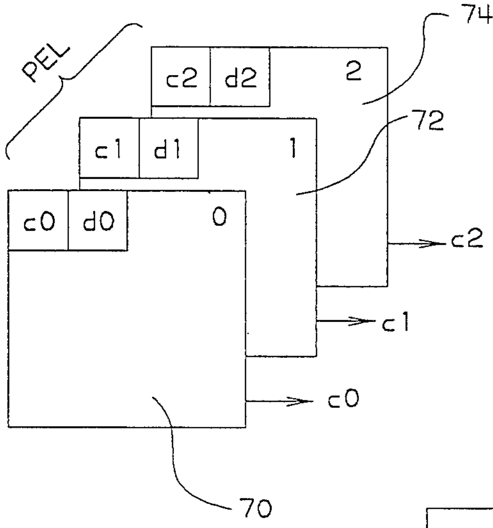
FIG.3
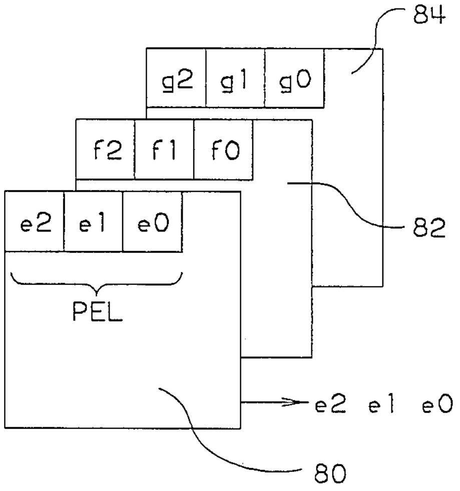
FIG.6
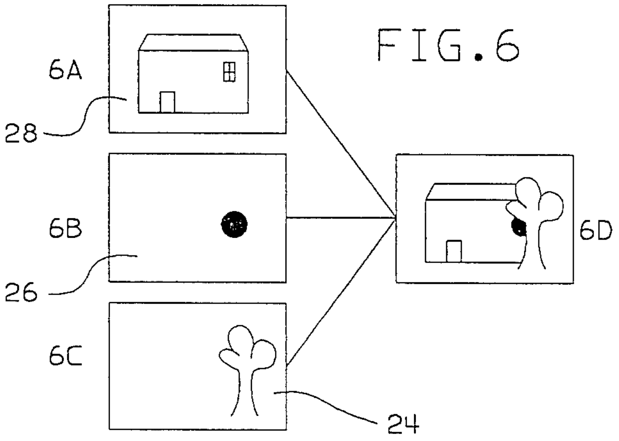
FIG.4
| $C_2$ | $C_1$ | $C_0$ | COLOR |
|---|---|---|---|
| 0 | 0 | 0 | BLACK |
| 0 | 0 | 1 | BLUE |
| 0 | 1 | 0 | GREEN |
| 0 | 1 | 1 | CYAN |
| 1 | 0 | 0 | RED |
| 1 | 0 | 1 | MAGENTA |
| 1 | 1 | 0 | YELLOW |
| 1 | 1 | 1 | WHITE |
FIG.7
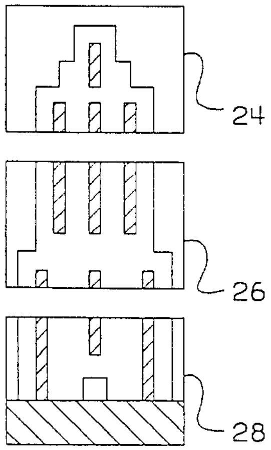

APPARATUS AND METHOD FOR MANAGING MULTIPLE IMAGES IN A GRAPHIC DISPLAY SYSTEM

BACKGROUND OF THE INVENTION

1. Field of the Invention

The present invention is generally related to computer display systems, and particularly to hardware and software systems that display images in a plurality of colors, that display data from multiple software application programs, or that combine several images on cathode ray tubes (CRT) or other like displays commonly used in computer and data processing systems. The present invention more particularly relates to the display of graphics and character output in color, or in multiple shades of gray, and to the display of data where animation or movement of one or more displayed objects is desired.

2. Description of Related Art

A graphics display system encodes data representing the graphic or character information to be displayed into discrete picture elements or pels. A digital memory, typically a random access memory (RAM), stores the encoded picture elements (pels) which make up a display frame. The graphic display is then generated by a video processor which accesses the stored pel data, decodes the data into signals required for the display monitor to generate color or multigray shade images, and transmits the signals to the CRT or other display monitor. The pels are rapidly displayed in a raster scan of the display monitor faceplate. The scan, typically horizontal, is comprises of a number of scan lines each comprised of a number of pels. The pel data stored in the memory is typically encoded in one of two forms. In bit-encoded graphics systems each pel is represented by several, e.g. three, binary units or bits of data. The bits are organized into planes with each plane having one bit for each pel on the display monitor. Thus, the three bits of data representing a particular pel are stored at the same vertical and horizontal offset in three separate bit planes. The final video display screen is generated by simultaneously accessing the bit planes, passing the resulting set of three bits to a translation table which generates the control signals required to create the color or shade of gray. The individual bit planes contain only part of the information necessary to create the final display structure, it is only through the combination of the three planes and decoding of the associated colors or shades of gray, that the display image structure is realized.

A second method of encoding is lateral bit encoding. In this method, a sequential set of bits is used to encode each pel of the display image. For example, a sequence of two bits may be used to encode each pel on the display. If one bit is used to encode each pel that bit simply indicates whether the pel is to be on or off. If on, the system specified foreground color is displayed, otherwise the background color is displayed. If two bits per pel are used, the non-zero value indicates which one of three foreground colors to display. A lateral bit encoded image can be stored in a single bit plane and is accessed sequentially in relative screen positions, for example, from left to right, and top to bottom.

The prior art contains several examples of both bit plane and lateral bit encoded graphics display systems.

U.S. Pat. No. 4,691,295 to Erwin et al., discloses a graphics system that employs four bit planes for bit encoded graphics display. Erwin et al. allow use of the bit planes as a group to form a single bit encoded image, and allows selective display of data from individual bit planes. However, Erwin et al. do not suggest a display system that can operate in either bit encoded or lateral bit encoded modes to create systems with distinctly different "personalities".

Other devices have used multiple memory buffers to store and display a series of lateral bit encoded images on the screen. U.S. Pat. No. , 4,653,020 to Cheselka et al., commonly assigned, discloses a system where multiple buffers are used to store encoded characters generated from multiple applications. Each of the buffers is displayed in a separate window on the display screen. There is no merging of data from the several buffers. Cheselka et al. are concerned only with character displays and not with the display of graphics images.

U.S. Pat. No. 4,317,114 to Walker discloses a display processor where several lateral bit encoded image planes are overlayed and merged with data from a host computer system to create the final display screen image. Walker doesn't provide multiple use of the buffers and fails to teach a method for controlling image mixing.

Iwami, in U.S. Pat. No. 4,682,297, commonly assigned, provides a graphics display system that creates a composite image by merging multiple images from separate memory buffers. The images are merged based on a selection of a "transparent" color which allows the background image to be viewed wherever that "transparent" color exists. This implementation is useful for creating displays with moving objects since the moving object can be "moved" (i.e. erased and redrawn) in a single plane which is then merged with other planes containing non-moving objects Iwami, however, provides an apparatus for merging only two image buffers. It cannot be readily extended to three or more buffers, and doesn't teach the dual use of buffers.

Thus, the prior art display systems typically support only one of the two image encoding methods, or primarily support one method with the second method receiving only limited support. This functional rigidity limits the application of a particular graphics display system and is a significant disadvantage, particularly in the general purpose display system field.

BRIEF SUMMARY OF THE INVENTION

This invention relates to the provision of hardware and software apparatus and processes to support both bit encoded and multiplane lateral bit encoding techniques in a graphics display environment. The single hardware structure provides a number of independent memory buffers which can support the display of a wide range of colors using bit encoding or can be used to support several independent application program displays or multiple image mixing using lateral bit encoding.

For example, if three buffers are implemented in the hardware, the system will support bit encoding and display of $2^3=8$ colors or lateral bit encoding of three independent applications or image sets. The images from the lateral bit encoded memory buffers can be mixed using hardware or software to provide composite images and can support apparent image movement or animation. A hardware implementation of image mixing allows the images to be combined and written directly to the video display monitor without generating an intermediate frame buffer containing the composite image. This technique improves display system efficiency in computer devices with limited processing power because movement of an object in one plane, or changes to the images in any plane, does not require a complete regeneration of an intermediate frame buffer. The lateral bit encoded buffers can each be linked to separate application programs running in the processor to capture output images and messages from that application. The display system can be configured to display the resulting independent images separately on the display monitor, or it can combine two or more of the images to form a composite display image. Finally, the three buffers can be linked in a manner which allows smooth scrolling through the linked image as if it was one large page.

Other features and advantages of the present invention will be understood by those with skill in the art after referring to the Detailed Description of the invention contained herein.

BRIEF DESCRIPTION OF THE DRAWINGS

FIG. 2 is a representation of memory storage of a bit encoded pel.

FIG. 3 is a representation of memory storage of a lateral bit encoded pel.

FIG. 4 is an illustration of color decoding tables for bit encoded pels.

FIG. 6 is an illustration of image mixing according to the present invention.

FIG. 7 is an illustration of large image linking according to the present invention.

DETAILED DESCRIPTION

The invention described herein relates to a graphics display system for displaying graphics images on a display device. The invention is described for use with a raster scan cathode ray tube (CRT) display; however, the concepts are applicable to many other types of displays including gas panels and liquid crystal displays Therefore, those skilled in the art will understand that the mention of CRT displays or video monitors is by way of example only.

Figure 1:
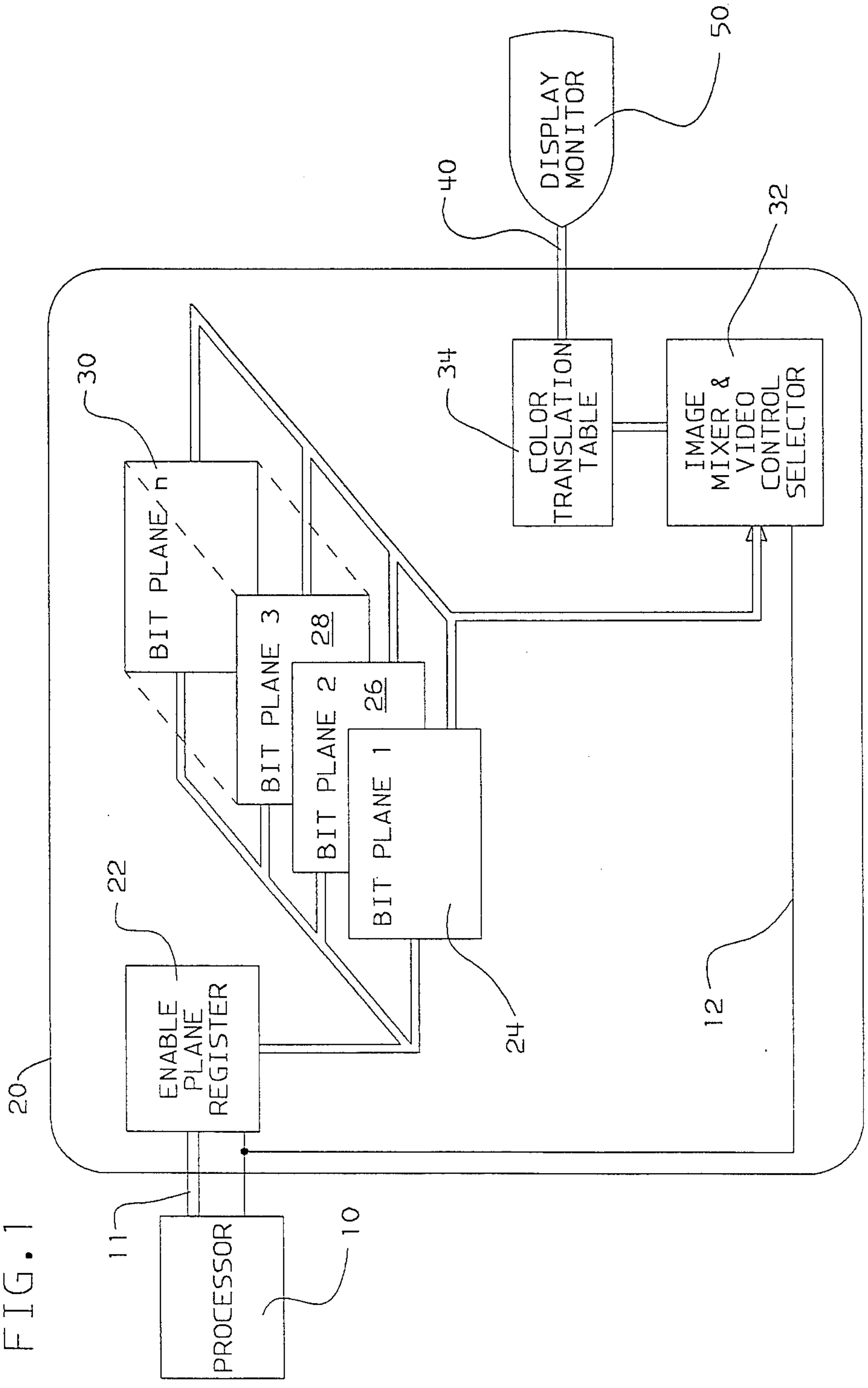
FIG. 1 is a block diagram of the major elements of a graphics display system embodying the invention.

A graphics display system is represented in the block diagram of FIG. 1. A processor 10 running an application or operating system program generates output messages which are transmitted along data path 11 to a graphics display adapter 20. Graphics display adapter 20 has as its primary function the conversion of the output messages into a form suitable for generating control signals to create a display on a video display monitor 50. Display monitor 50, in the preferred embodiment, is a standard display monitor responsive to red, green and blue control signals, for example, an IBM Model 5272 Color Display. The values of the incoming red, green and blue control signals cause the display monitor to create an image with the necessary color Graphics display adapter 20, embodying the present invention, has the following major components. Output messages from the processor 10 are formatted and stored in memory buffers, or bit planes 24, 26, 28, and 30. Each bit plane contains, at a minimum, sufficient storage locations to fill one screen of the display monitor 50. For example, in the preferred embodiment the display monitor has the capacity to display 350 horizontal lines each containing 720 picture elements or pels. Therefore, in the example system, each bit plane must contain at least 252,000 bits. Bit plane encoding requires one bit per pel in each p while lateral bit encoding requires several.

Enable plane register 22 selects the encoding state of the graphics display adapter in response to control signals 12 from the processor. The graphics display encoding state can either be multiplane bit encoding or single plane lateral bit encoding. If the lateral bit encoding state is in effect, Enable Plane Register 22 selects the bit plane to receive the data from processor 10.

Image mixer 32 reads the encoded graphics data from the memory buffers 24, 26, 28, and 30 and performs the necessary decoding and image mixing. If bit plane encoding is being used, image mixer 32 selects the corresponding bits from the bit planes and passes them to the color translation table 34 which translates the code into the appropriate red, green, and blue control signals which are passed on data channel 40 to the display monitor 50. In the lateral bit encoding state the image mixer 32 combines the images contained on the bit planes according to a bit plane priority. The display of images from a particular plane is enabled by a video select control which enables one or more planes for display. The merged images are passed through the color translation table 34 which generates the appropriate control signals to be passed on data line 40 to display monitor 50.

FIG. 2 and FIG. 3 illustrate the differences between bit encoding using bit plane and lateral bit encoding of picture element data. FIG. 2 illustrates three bit planes 70, 72, and 74. A picture element (pel) corresponding to a given location on the screen is represented by a single bit FIG. 2 the first pel is represented by bits $c_0$, $c_1$, $c_2$. The next pel of the display image would be represented in the next bit position in each plane, namely $d_0$, $d_1$, and $d_2$. The information stored in any one plane represents only a subset of the information required to create the picture element on the display monitor. None of the planes represent the full structure of the image; it is only the combination of the several planes that allows the final image to be made apparent. Data is read from each bit plane simultaneously from the same relative bit location. For example, bits $c_0$, $c_1$ and $c_2$ would be read from the bit planes to form a single picture element for display. The decoding of the picture element represented by $c_0$, $c_1$ and $c_2$ is illustrated in FIG. 4. If $c_0$, $c_1$ and $c_2$ have the values 1, 1, 0 respectively, the the color cyan will be generated at that point on the display monitor. (Note that $C_0$ is the least significant bit in the translation table.)

In lateral bit encoding of an image, only one bit plane 80 is used to store an image. Additional planes 82 and 84 store other images. In FIG. 3 a picture element (pel) is encoded in the first three bits of the bit plane 80, $e_0$, $e_1$, $e_2$. Data is read from the bit plane sequentially producing picture element output $e_2$, $e_1$, $e_0$. This output determines the foreground color, if any, to be displayed at this pel. In lateral bit encoding, the full form of the image is represented in the single bit plane 80.

An important feature of the invention is the ability to use each of the bit planes 24, 26, 28, 30 in either bit plane or lateral bit encoding modes. As described above, prior art devices typically implement only one of the picture element encoding methodologies. In some cases, a device supports bit plane encoding and will allow only one of the bit planes to be used in a lateral bit encoding mode. The present invention allows all of the bit planes present in the graphics adapter to be used simultaneously in lateral bit encoding mode. The enable plane register 22 determines whether the adapter is in bit plane or lateral bit mode and, when the adapter is in lateral bit mode, enable plane register 22 controls the association of the output from processor 10 to the particular bit plane 24, 26, 28, or 30. In this way, different applications running in processor 10 can each write to independent bit planes or an application can store separate components of an image or separate planes for later mixing, e.g. planes could be used for background, foreground and intermediate objects where apparent motion of intermediate objects is desired. Those bit planes can then be read and written separately on display monitor 50.

This invention also provides an inventive capability to combine images from separate lateral bit encoded bit planes. Image mixing is performed by image mixer 32 which reads data from the bit planes, combines the image data and transmits it directly to the display monitor. There is no requirement for an intermediate frame buffer to store the results of the image mixing operation. This is a significant advantage because a change to one of the bit planes does not require the complete regeneration of an intermediate frame buffer. This improved image mixing is of particular value for animation on the display monitor. The image mixing logic will allow proper handling of foreground and background objects in relation to a moving object.

A single application can be established to write to three different bit planes. For example, bit plane 24 can be designated to hold foreground objects, bit plane 26 can hold moving objects, while bit plane 28 holds background objects. FIG. 6 illustrates the application of this concept. A tree as shown in FIG. 6C can be written to foreground bit plane 24. A ball can be written to the moving object plane 26 as shown in FIG. 6B. Finally, a house can be written to the background bit plane 28 as shown in FIG. 6A. The image mixer 32 will combine the picture element data from each of the three bit planes and generate the display shown in FIG. 6D on display monitor 50. In this display the tree will appear in front of both the house and the ball, while the ball will appear in front of the house. If movement of the ball is animated so that the ball moves from left to right in the diagram, only the moving object bit plane 26 will need to be modified. The image mixer 32 will continue to create the appropriate display on the display monitor 50 by combining the elements from the three bit planes in the appropriate order. There are no inefficiencies introduced by having to recreate hidden portions of background objects that become exposed due to movement, or to recreate or delete portions of the moving object that become exposed or hidden during movement.

Figure 5:
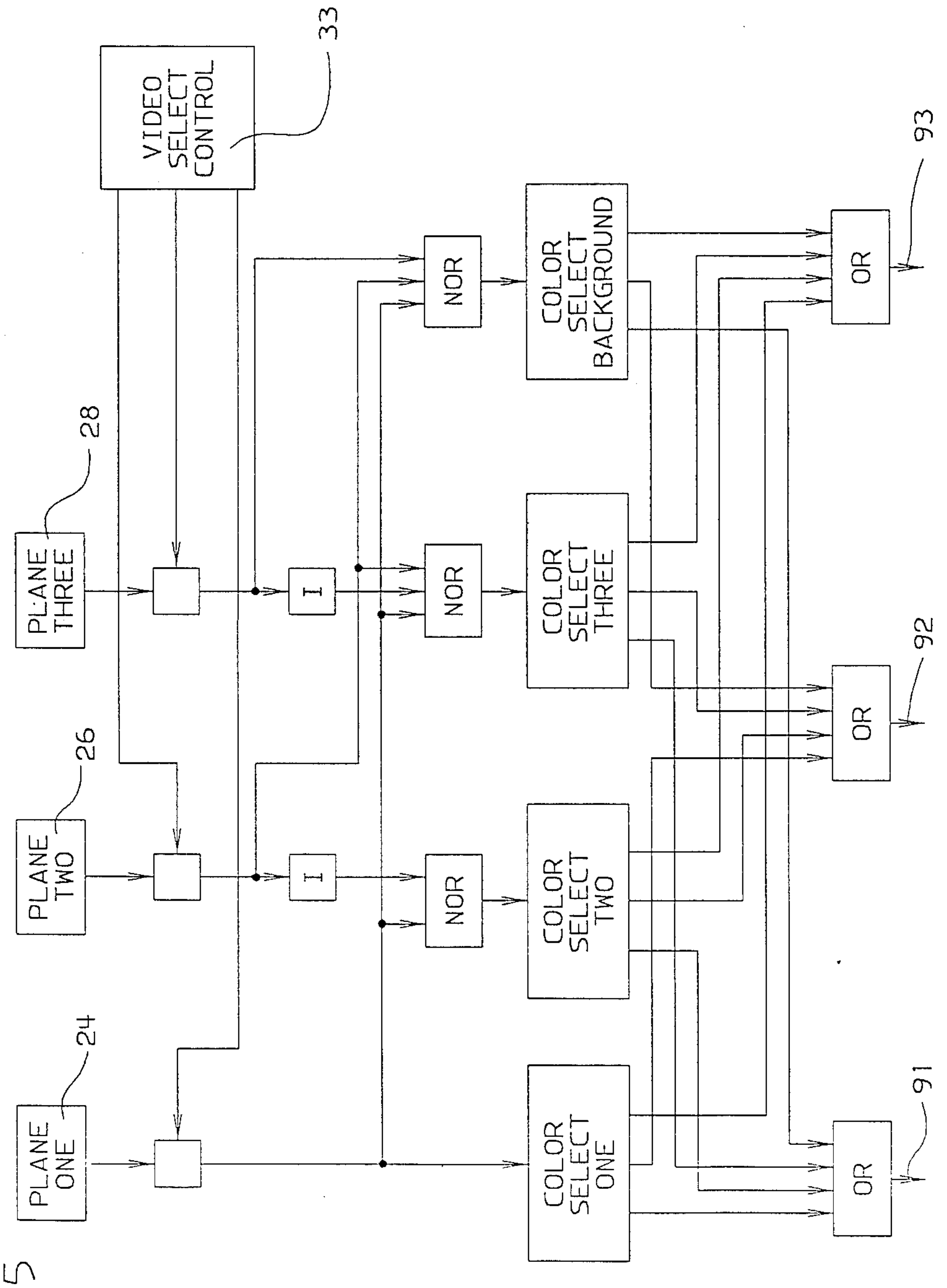
FIG. 5 is a logic diagram for image mixing according to the present invention.

A logic diagram for the image mixer 32 is shown in FIG. 5. It will be appreciated by those skilled in the art that this logic could be implemented either through software or through hardware logic circuits In the preferred embodiment, the logic is implemented in hardware to reduce the processing workload required of processor 10. This has the advantage of providing a very efficient, and responsive graphics display system even where processor 10 is of limited capacity.

Referring to FIG. 5, lateral bit encoded data is simultaneously accessed from each of the bit planes 24, 26, and 28 as long as that plane has been enabled by Video Select Control 33. Each pel accessed represents either a blank or non-blank image for the display. In the preferred embodiment, a blank image is represented by a binary zero. (i.e. if three bit lateral bit encoding is being used the pel value would be represented by a binary '000'.) The display priority is established so that bit plane 24 overlays bit plane 26 and in turn both overlay bit plane 28. Comparator circuits determine that if a non-zero pel code is read from plane 1 that code will be transmitted through the red, green and blue outputs 91, 92, and 93. If the bit code from bit plane 24 is zero, but the bit code from plane 26 is non-zero, then the image from bit plane 26 will be displayed. Similarly if the bit code from plane 24 and plane 26 are zero and the code from plane 28 is non-zero, the plane 28 code will be displayed. Finally, if all three pel codes are zero, a background color will be displayed.

In an alternate form of operation, the memory buffers 24, 26, 28 each store the encoded display images from a separate application. Enable plane register 22 associates a particular memory buffer with an application. Video Select Control 33 responds to control signals 12 to display one of the images.

In yet another form of operation the bit planes can be linked to form a single large image storage area (FIG. 7). This image can be smoothly scrolled on the display monitor as though it was a continuous image. The linkage is established and controlled by image mixer 32. Video Select Control 33, under the control of processor 10 via control 12, controls the selection of pixels for display from planes 24, 26 and 28. Video select control 33 selects pixels from the linked planes for display.

Those skilled in the art will realize that the invention has been described by way of example making reference to but one preferred embodiment while describing or suggesting alternatives and modifications. All such modifications are intended to be within the spirit and scope of the following claims.

We claim:

1. A system for displaying graphics images on a display device, said system comprising:

memory means for storing graphics images represented by a plurality of picture elements, said memory means organized into a plurality of memory buffers and operable in a first display system state wherein each of said picture elements is encoded as a plurality of bits and one of said encoded bits is stored in respective positions in each of said plurality of memory buffers, or a second display system state wherein each of said picture elements is encoded as a plurality of bits and said encoded bits are stored in successive positions of one of said memory buffers;

state control means for selecting between said first display system state and said second display system state said state control means being connected to said memory means;

control means for associating one or more of said plurality of memory buffers with one or more encoded graphics image creating application programs, said control means being operable when said system is in said control display system state;

selection means for enabling transmission of picture elements from one or more of said plurality of memory buffers to said display device;

image mixing means for combining for display said picture elements from said one or more of said plurality of memory buffers according to an image display priority in said image mixing means;

display generating means for generating display control signals to control said display device, said display generating means being connected to and responsive to said image mixing means; and linking means for linking one or more of said plurality of memory buffers to create a single large image, which can be smoothly scrolled on said display device.

2. A method for displaying images stored as encoded picture elements in a plurality of memory buffers, said memory buffers organized to operate in a first state in which a picture element is stored as a plurality of bits at respective locations in each of said plurality of memory buffers or a second state in which a picture element is stored at adjacent locations in a single buffer with each memory buffer containing picture elements representing images for display in a display area of a graphics display device, said method comprising:

determining whether said buffers are operating in said first or second state;

if in said first state, accessing a picture element by simultaneously accessing respective locations in each of said plurality of memory buffers and displaying a picture element formed by the accessed bits;

if in said second state:

repeating the following steps for each picture element storage location corresponding to a location in said display area;

simultaneously accessing one picture element from each of said plurality of memory buffers, said picture elements corresponding to a single display area location;

determining a display priority for each of said plurality of memory buffers;

examining each corresponding picture element according to said display priority to determine whether said picture element represents a blank or non-blank image portion of said display area;

displaying the examined picture element if it represents a non-blank image portion of said display area;

ignoring the other corresponding picture elements once one picture element has been displayed; and displaying a background color if none of said corresponding picture elements represents a non-blank image portion of said display area.

3. The method of claim 2 further comprising the steps of:

if said buffers are operating in said second state:

enabling one or more of said plurality of memory buffers for access; and ignoring picture element data from any memory buffer no enabled.

4. A method of displaying a movable object with apparent motion relative to a background on a graphics display device, said method comprising the steps of:

writing encoded images comprising said background to a first memory means with a first display priority;

writing encoded images representing said moveable object at locations in a second memory means with a second display priority higher than said first display priority;

combining said encoded images from said memory means, retaining for display the combined encoded image from the memory means with the highest display priority;

displaying said combined images on a graphics display device;

erasing said encoded images representing said moveable object and rewriting said encoded images at locations displaced from the previous locations of said encoded images;

repeating said combining, displaying, and erasing and rewriting steps at a rate sufficient to create the appearance that the encoded images representing said moveable object moves relative to said background on said display device.

5. A method according to claim 4, further comprising the step of writing images to a third memory means with a third display priority higher than said second display priority.

6. An apparatus for combining for display on a display device images stored as encoded picture elements, said apparatus comprising:

memory means for storing encoded picture elements organized as a plurality of memory buffers;

state control means for selecting between a first system state in which a plurality of bits representing a picture element are stored at an equivalent relative location in each of a plurality of memory buffers and a second system state in which a plurality of bits representing a picture element are stored at adjacent locations in a single memory buffer;

selector control means responsive to said state control means and connected to said plurality of memory buffers for controlling selection of picture element bits from said buffers;

bypass means for bypassing an image mixing operation when said state control means is in said first system state, said bypass means comprising:

first signal generating means for generating a display control signal from said picture element bits stored in equivalent relative locations in said plurality of memory buffers;

image mixing means for combining picture elements stored in said memory buffers when said state control means is in said second system state, said image mixing means comprising:

first selector means connected to a first memory buffer for decoding said encoded picture elements if they are not zero;

first logic means responsive to said first memory buffer and a second memory buffer for generating an encoded output when said first memory buffer encoded picture element is zero and said second memory buffer encoded picture element is on-zero;

second selector means connected to said first logic means for decoding said encoded output when said encoded output is non-zero;

second logic means responsive to said first memory buffer, said second memory buffer and a third memory buffer for generating a second encoded output when said first memory buffer encoded picture element is zero, and said second memory buffer encoded picture element is zero, and said third memory buffer picture element is non-zero;

third selector means connected to said second logic means for decoding said second encoded output when said second encoded output is non-zero;

third logic means for generating a third encoded output when said first, second and third memory buffer encoded picture elements are zero;

fourth selector means connected to said third logical means for decoding said third encoded output when said third encoded output is non-zero;

second signal generating means for generating a display control signal when a first binary digit of said decoded output of said first, second, third or fourth selector is non-zero;

third signal generating means for generating a display control signal when a second binary digit of said decoded output of said first, second, third or fourth selector is non-zero;

fourth signal generating means for generating a display control signal when a third binary digit of said decoded output of said first, second, third, or fourth selector is non-zero; and enabling means associated with each of said memory buffers of said memory means for enabling said buffers to output data in response to said first, second, or third selector means.

* * * * *